(12) United States Patent
Doerre et al.

(10) Patent No.: US 6,446,061 B1
(45) Date of Patent: Sep. 3, 2002

(54) TAXONOMY GENERATION FOR DOCUMENT COLLECTIONS

(75) Inventors: Jochen Doerre; Peter Gerstl; Sebastian Goeser, all of Stuttgart; Adrian Mueller, Boeblingen; Roland Seiffert, Herrenberg, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,260

(22) Filed: Jun. 30, 1999

(30) Foreign Application Priority Data

Jul. 31, 1998 (EP) .............................. 98114371

(51) Int. Cl.[7] .............................. G06F 17/30
(52) U.S. Cl. ....................... 707/3
(58) Field of Search .............. 707/101, 6, 3; 705/10; 706/50

(56) References Cited

U.S. PATENT DOCUMENTS 6,233,575 B1 * 6/2000 Agrawal et al. ............... 707/6

OTHER PUBLICATIONS

Y.S. Maarek and G.E. Kaiser, "Change Management for Very Large Software Systems", Conference Proceedings, Seventh Annual International Phoenix Conference on Computers and Communications, p. 280–285, 1988.

Yoelle S. Maarek, "On the use of cluster analysis for assisting maintenance of large software systems", Third Israel Conference on Computer Systems and Software Engineering, p. 178–186, 1988.

J. Mothe, T. Dkaki, B. Dousset, "Mining Information in Order to Extract Hidden and Strategic Information", Proceedings of Computer–Assisted Information Searching on Internet, RIAO97, p. 32–51, Jun. 1997.

M. Iwayama, T. Tokunaga, "Cluster–Based Text Categorization: A Comparison of Category Search Strategies", Proceedings of SIGIR 1995, p. 273–280, Jul. 1995, ACM.

Y. Maarek, A.J. Wecker, "The Librarian's Assistant: Automatically organizing on–line books into dynamic bookshelves", Proceedings of RIAO'94, Intelligent Multimedia, IR Systems and Management, NY, 1994.

Yoelle S. Maarek, D.M. Berry and G.E. Kaiser, "An Information Retrieval Approach for Automatically Constructing Software Libraries", IEEE Transactions on Software Engineering, vol. 17, No. 8, p. 800–813 Aug. 1991.

(List continued on next page.)

*Primary Examiner*—Diane D. Mizrahi
*Assistant Examiner*—Apu Mofiz
(74) *Attorney, Agent, or Firm*—R. Bruce Brodie; Marc D. McSwain

(57) ABSTRACT

This mechanism relates to a method within the area of information mining within a multitude of documents stored on computer systems. More particularly, this mechanism relates to a computerized method of generating a content taxonomy of a multitude of electronic documents. The technique proposed by the current invention is able to improve at the same time the scalability and the coherence and selectivity of taxonomy generation. The fundamental approach of the current invention comprises a subset selection step, wherein a subset of a multitude of documents is being selected. In a taxonomy generation step a taxonomy is generated for that selected subset of documents, the taxonomy being a tree structured taxonomy hierarchy. Moreover this method comprises a routing selection step assigning each unprocessed document to the taxonomy hierarchy based on largest similarity.

31 Claims, 4 Drawing Sheets

OTHER PUBLICATIONS

Richard Helm and Yoelle S. Maarek, "Integrating Information Retrieval and Domain Specific Approache for Browsing and Retrieval in Object Oriented Class Libraries", Proceedings of OOPSLA'91, p.47–61, Phoenix, AZ, Oct. 1991.

Yoelle S. Maarek and Frank A. Smadja, "Full Text Indexing Based on Lexical Relations. An Application: Software Libraries", Proceedings of SIGIR'89, $12^{th}$ International Conference on Research and Development in Information Retrieval, ed. N.J. Belkin and C.J. van Rijsbergen, Special Issue of the SIGIR Forum, ACM Press, p. 198–206, Cambridge, MA, Jun. 1989.

Yoelle S. Maarek and Daniel M. Berry, "The Use of Lexical Affinities in Requirements Extraction", Proceedings of the Fifth International Workshop on Software Specification and Design, p. 196–202, Pittsburgh, PA, May 19–20, 1989.

Michael Herscovici et al., "The Shark–Search Algorithm— An Application: Tailored Web Site Mapping", Proceedings of WWW7, the $7^{th}$ International World Wide Web Conference, Brisbane, Apr., 1998. Also appeared in the Journal of Computer Networks and ISDN 30 (1998), p. 317–326. Also available at http://www7.scu.edu.au/programme/fullpapers/1849/com1849.htm.

Yoelle S. Maarek et al., "WebCutter: A system for dynamic and tailorable site mapping", Proceedings of WWW6, the $6^{th}$ International World Wide Web Conference, Santa Clara, CA, Apr. 1997. Also appeared in the Journal of Computer Networks and ISDN 29 (1997), p. 1269–1279. Also available at http://www.scope.gmd.de/info/www6/technical/paper040/paper40.htm.

Yoelle S. Maarek and Israel Z. Ben Shaul, "Automatically Organizing Bookmarks per Contents", Proceedings of WWW5, the $5^{th}$ International World Wide Web Conference, Paris, May 1996. Also appeared in the Journal of Computer Networks and ISDN 28, No. 7–11, p. 1321–1334. Also available at http://www5conf.inria.fr/fich_html/papers/P37/Overview.htm.

* cited by examiner

| | caribsusg,murphy |
|---|---|
| | nt,window, applic,develop / microsoft,window |
| | corp,microsoft |
| nt,window<br>managed,network<br>site,web<br>nt,server<br>applic,develop | nt,window, anti,virus /<br>ip,switch |
| | ce,window |
| | nt,window, managed,network /<br>nt,server |
| | nt,window, unix,workstation /<br>compute,network |

FIG. 3

| | bank, NatWest Securities, comment |
| --- | --- |
| bank<br>banking<br>Federal Reserve Ban<br>fund<br>IWHome Banking | bank, banking, Banc One Corp.0001<br><br>bank, fund, pay<br><br>bank, Federal Reserve Ban, International Bank<br><br>bank, banking, IWHome Banking |

FIG. 4

TAXONOMY GENERATION FOR DOCUMENT COLLECTIONS

FIELD OF THE INVENTION

The present invention relates to a method within the area of information mining within a multitude of documents stored on computer systems. More particularly, the invention relates to a computerized method of generating a content taxonomy of a multitude of electronic documents.

BACKGROUND OF THE INVENTION

Organizations generate and collect large volumes of data, which they use in daily operations. Yet many companies are unable to capitalize fully on the value of this data because information implicit in the data is not easy to discern. Operational systems record transactions as they occur, day and night, and store the transaction data in files and databases. Documents are produced and placed in shared files or in repositories provided by document management systems. The growth of the Internet, and its increased worldwide acceptance as a core channel both for communication among individuals and for business operations, has multiplied the sources of information and therefore the opportunities for obtaining competitive advantages. Business Intelligence Solutions is the term that describes the processes that together are used to enable improved decision making. Information mining is the process of data mining and/or text mining. It uses advanced technology for gleaning valuable insights from these sources that enable the business user making the right business decisions and thus obtaining the competitive advantages required to thrive in today's competitive environment. Information Mining in general generates previously unknown, comprehensible, and actionable information from any source, including transactions, documents, e-mail, web pages, and other, and using it to make crucial business decisions.

Data is the raw material. It can be a set of discrete facts about events, and in that case, it is most usefully described as structured records of transactions, and it is usually of numeric or literal type. But documents and Web pages are also a source of an unstructured data, delivered as a stream of bits which can be decodified as words and sentences of text in a certain language. Industry analysts estimate that unstructured data represent 80% of an enterprise information compared to 20% from structured data; it comprises data from different sources, such as text, image, video, and audio; text, is however, the most predominant variety of unstructured data.

The IBM Intelligent Miner Family is a set of offerings that enables the business professional and in general any knowledge worker to use the computer to generate meaningful information and useful insights from both structured data and text. Although the general problems to solve (e.g.. clustering, classification) are similar for the different data types, the technology used in each case is different, because it needs to be optimized to the media involved, the user needs, and to the best use of the computing resources. For that reason, the IBM Intelligent Family is comprised of two specialized products: the IBM Intelligent Miner for Data, and the IBM Intelligent Miner for Text.

Information mining has been defined as the process of generating previously unknown, comprehensible, and actionable information from any source. This definition exposes the fundamental differences between information mining and the traditional approaches to data analysis such as query and reporting and online analytical processing (OLAP) for structured data, and from full text search for textual data. In essence, information mining is distinguished by the fact that it is aimed at the discovery of information and knowledge, without a previously formulated hypothesis. By definition, the information discovered through the mining process must have been previously unknown, that is, it is unlikely that the information could have been hypothesized in advance. For structured data, the interchangeable terms "data mining" and "knowledge discovery in databases" describe a multidisciplinary field of research that include machine learning, statistics, database technology, rule based systems, neural networks, and visualization. "Text mining" technology is also based on different approaches of the same technologies; moreover it exploits techniques of computational linguistics.

Both data mining and text mining share key concepts of knowledge extraction, such as the discovery of which features are important for clustering, that is, finding groups of similar objects that differ significantly from other objects. They also share the concept of classification, which refers to finding out to which class it belongs a certain database record, in the case of data mining, or to a document, in the case of text mining. The classification schema can be discovered automatically through clustering techniques (the machine finds the groups or clusters and assigns to each cluster a generalized title or cluster label that becomes the class name). In other cases the taxonomy can be provided by the user, and the process is called categorization.

Many of the technologies and tools developed in information mining are dedicated to the task ol discovery and extraction of information or knowledge from text documents, called feature extraction. The basic pieces of information in text—such as the language of the text or company names or dates mentioned—are called features. Information extraction from unconstrained text is the extraction of the linguistic items that provide representative or otherwise relevant information about the document content. These features are used to assign documents to categories in a given scheme, group documents by subject, focus on specific parts of information within documents, or improve the quality of information retrieval systems. The extracted features can also serve as meta data about the analyzed documents. Extracting implicit data from text can be interesting for many reasons; for instance:

- to highlight important information e.g. to highlight important terms in documents. This can give a quick impression whether the document is of any interest.
- to find names of competitors e.g. when doing a case study in a certain business area one can do a names extraction on the documents that one has received from different sources and then sort them by names of competitors.
- to find and store key concepts. This could replace a text retrieval system where huge indexes are not appropriate but only a few key concepts of the underlying document collection should be stored in a database.
- to use related topics for query refinement e.g. store the key concepts found in a database and build an application for query refinement on top of it. Thus topics that are related to the users' initial queries can be suggested to help them refine their queries.

Feature extraction from texts, and the harvesting of crisp and vague information, require sophisticated knowledge models, which tend to become domain specific. A recent research prototype has been disclosed by J. Mothe, T. Dkaki, B. Dousset, "Mining Information in Order to Extract Hidden and Strategic Information", Proceedings of Computer- Assisted Information Searching on Internet, RIAO97, pp 32–51, June 1997.

A further technology of major importance in information mining is dedicated to the task of clustering of documents. Within a collection of objects a cluster could be defined as a group of objects whose members are more similar to each other than to the members of any other group. In information mining clustering is used to segment a document collection into subsets, the clusters, with the members of each cluster being similar with respect to certain interesting features. For clustering no predefined taxonomy or classification schemes are necessary. This automatic analysis of information can be used for several different purposes:

- to provide an overview of the contents of a large document collection;
- to identify hidden structures between groups of objects e.g. clustering allows that related documents are all connected by hyper links;
- to ease the process of browsing to find similar or related information e.g. to get an overview over documents;
- to detect duplicate and almost identical documents in an archive.

Typically, the goal of cluster analysis is to determine a set of clusters, or a clustering, in which the inter-cluster similarity is minimized and intra-cluster similarity is maximized. In general, there is no unique or best solution to this task. A number of different algorithms have been proposed that are more or less appropriate for different data collections and interests. Hierarchical clustering works especially well for textual data In contrast to flat or linear clustering where the clusters have no genuine relationship, the clusters in a hierarchical approach are arranged in a clustering tree where related clusters occur in the same branch of the tree. Clustering algorithms have a long tradition. Examples and overviews of clustering algorithms may be found in M. Iwayama, T. Tokunaga, "Cluster-Based Text Categorization: A Comparison of Category Search Strategies", in: Proceedings of SIGIR 1995, pp 273–280, July 1995, ACM. or in Y. Maarek, A. J. Wecker, "The Librarian's Assistant: Automatically organizing on-line books into dynamic bookshelves", in: Proceedings of RIAO '94, Intelligent Multimedia, IR Systems and Management, N.Y., 1994.

A further technology of major importance in information mining is dedicated to the task of categorization of documents. In general, to categorize objects means to assign them to predefined categories or classes from a taxonomy. The categories may be overlapping or distinct, depending on the domain of interest. For text mining, categorization can mean to assign categories to documents or to organize documents with respect to a predefined organization. Categorization in the context of text mining means to assign documents to preexisting categories, sometimes called topics or themes. The categories are chosen to match the intended use of the collection and have to be trained beforehand. By assigning documents to categories, text mining can help to organize them. While categorization cannot replace the kind of cataloging a librarian does, it provides a much less expensive alternative.

State of the art technologies for taxonomy generation suffer several deficiencies, like:

- the problem of navigational balance: the taxonomy must be well-balanced for navigation by an end-user. In particular, the fan-out at each level of the hierarchy must be limited, the depth must be limited, and there must not be empty nodes.
- the problem of orientation: nodes in the taxonomy should reflect "concepts" and give sufficient orientation for a user traversing the taxonomy.
- the problem of coherence and selectivity: the leaf nodes in the taxonomy should be maximally coherent with all assigned documents having the same thematic content. Related documents from different nodes should appear within short distance in the taxonomy structure.

The most important problems of the current state of the art technologies for taxonomy generation are

- the problem of scalability: any document of the collection must be assigned to some leaf node in the taxonomy and the whole taxonomy generation process must be applicable to a significantly larger number of documents and still being able to generate a taxonomy within a reasonable amount of time.
- the problem of domain-independence: no hand-coded knowledge on the domain to be analyzed derived from an analysis of the given document collection to steer and to speed up the taxonomy generation process should be used.

OBJECTIVE OF THE INVENTION

The invention is based on the objective to improve the scalability of an taxonomy generation process allowing a taxonomy generation method to cope with increasing numbers of documents to be analyzed in a reasonable amount of time. It is a further objective of the current invention to improve said scalability and at the same time to guarantee domain-independence of the taxonomy generation method.

SUMMARY OF THE INVENTION

The current invention teaches a method of generating a content taxonomy of a multitude of documents (210) stored on a computer system and said method being executable by a computer system. The fundamental approach of the current invention comprises a subset-selection-step (201), wherein a subset of said multitude of documents is being selected. In a taxonomy-generation-step (202 to 205) a taxonomy is generated for that selected subset of documents, said taxonomy being a tree-structured taxonomy-hierarchy. Said subset is divided into a set of clusters with largest intra-similarity and each of said clusters of largest intra-similarity is assigned to a leaf-node of said taxonomy-hierarchy as outer cluster. The inner-nodes of said taxonomy-hierarchy are ordering said subset, starting with said outer clusters, into inner-clusters with increasing cluster-size and decreasing similarity. Moreover said method comprises a routing-selection-step (206), wherein for each unprocessed document of said multitude of documents not belonging to said subset its similarities with said outer-clusters are computed and said document is assigned to a leaf-node of said taxonomy-hierarchy comprising the outer-cluster with largest similarity.

The technique proposed by the current invention is able to improve at the same time the scalability and the coherence and selectivity of taxonomy generation. Scalability is provided as the taxonomy generation step, being the most time consuming part of the overall process, is operating on the selected subset of documents only. This approach alone would not be sufficient for solving the overall problem. It's due to the rest of the features of the claim 1 that the taxonomy of a reasonable selected and reasonable sized subset of documents is already a stable taxonomy with respect to the complete multitude of documents. The introduction of a separate routing selection step allows the mass of the documents to be assigned very efficiently in an already computed taxonomy. By exploiting a hierarchical taxonomy approach the leaf nodes in the taxonomy are coherent with all assigned documents having the same thematic content and related documents from different nodes appear within short distance in the taxonomy structure. The taxonomy generated according the current invention is very stable, i.e. increasing the size of reasonable sized subset of documents will not change the taxonomy in any essential manner. Moreover the proposed method is completely domain independent, i.e. no hand-coded knowledge on the domain to be analyzed derived from an analysis of the given document collection is required to steer and to speed up the taxonomy generation process. As a result the complete taxonomy generation process is fully automatic and does not require any human intervention or adaptation.

Additional advantages are accomplished by the aspect that said taxonomy-generation-step comprises a first-feature-extraction-step (202) extracting for each document of said subset its features and computing its feature statistics in a feature vector (212) as a representation of said document.

Introducing a distinct feature extraction step increases flexibility of the proposed method as it becomes possible to exploit different feature extraction technologies depending on the intended purpose of the taxonomy, depending on the document domain and depending on the characteristics of the various feature extraction technologies. Storing the time-consuming s computation of the feature-vectors speeds up processing as the feature-vectors can be used again in later processing steps.

Additional advantages are accomplished by the aspect that said taxonomy-generation-step comprises a clustering-step (203) using a hierarchical clustering algorithm to generate said taxonomy-hierarchy and using said feature-vectors for determining similarity.

Using the hierarchical clustering algorithm, working bottom-up, i.e. which starts with clusters comprising a single document and then working upwards by merging clusters until the root clusters has been generated, guarantees good coherence and selectivity of the taxonomy. Moreover the hierarchical clustering algorithm provides good orientation for a user traversing the taxonomy form "higher" nodes, i.e. nodes representing more abstract concepts, to "lower" nodes, i.e. nodes representing more concrete document information, and vice versa.

Additional advantages are accomplished by the aspect that said taxonomy-generation-step comprises a categorization-training-step (205) computing for each of said clusters a category-scheme (215) as a representation of said cluster and wherein said category-scheme comprising the feature-statistics of said cluster being calculated from said feature-vectors of each document of said cluster.

By combining the feature-vectors of the documents forming a certain cluster to a single quantity, the category-scheme, reflecting the comprised feature statistics, a cluster can be treated in certain ways "like a single document", which speeds up similarity comparison of an unprocessed document in the routing-selection-step significantly.

Additional advantages are accomplished by the aspect that said routing-step comprises a parallel feature-extraction step extracting for each of said unprocessed documents its features and computing its feature statistics in a feature-vector as a representation of said unprocessed document. In said routing-step said similarities between said unprocessed document and each of said outer-clusters is computed by comparing said feature-vector of said unprocessed document with said category-scheme of said cluster.

Based on above approach similarity calculations of an unprocessed document with respect to an outer-cluster is very effective as only two feature-vectors have to be compared, the feature-vector of the recently processed document and the category-scheme.

Based on above approach similarity calculations of an unprocessed document with respect to an outer-cluster is very effective as only two feature-vectors have to be compared, the feature-vector of the unprocessed document and the category-scheme.

Additional advantages are accomplished by the aspect that said first-feature-extraction-step and/or said second-feature-extraction-step extract features based on lexical affinities within said documents.

Exploiting lexical affinity technology allows the proposed method to determine (in a domain independent manner) multi-word phrases which have a much higher semantic meaning compared to the single terms. Thus orientation for the users is improved as the taxonomy is able to reflect "concepts".

Additional advantages are accomplished by the aspect that said first-feature-extraction-step and/or said second-feature-extraction-step extract features based on linguistic features within said documents.

Exploiting linguistic features technology allows the proposed method to determine (in a domain independent manner) names of people, organizations, locations, domain terms (multi-word terms) and other significant phrases from the text. Different variants are associated with a single canonical form. Thus in cases where "names" are of importance the proposed feature improves orientation and selectivity for the users.

Additional advantages are accomplished by the aspect that said lexical affinities are extracted with a window of M words to identify co-occurring words.

Allowing to adjust the window size to determine lexical affinities gives the freedom to control processing time versus complexity of extracted features. M being a natural number with $1<M\leq5$ represents a reasonable trade-off.

Additional advantages are accomplished by the aspect that extracted features, which occurred with a high statistical frequency and/or with a low statistical frequency, are ignored.

Using this approach the proposed method is able to concentrate on features which a high selective property. Ignoring high frequency features allows to exclude features which occur in many documents and thus are almost common to the documents. Filtering low-frequency terms avoids over fitting at the lower end of the taxonomy.

Additional advantages are accomplished by the aspect that the depth of the taxonomy-hierarchy is limited to L levels by the slicing technique merging most similar clusters into common cluster until said taxonomy-hierarchy comprises L levels.

This slicing is of importance to provide good orientation to a user. By merging clusters higher levels of abstraction, forming more general "concepts", are introduced. Moreover navigational balance in the taxonomy hierarchy is provided. An adaptable parameter L introduces freedom to tune the methodology. The parameter L being natural number from the range $1\leq L\leq12$ represents a reasonable trade-off.

Additional advantages are accomplished by the aspect that said taxonomy-generation-step comprises a labeling-step (204) labeling each node in the taxonomy-hierarchy.

Labeling the generated taxonomy is of central advantage for usability of the generated taxonomy.

Additional advantages are accomplished by the aspect that the N most frequent features of a cluster of a node in the taxonomy-hierarchy are used as labels.

For disambiguation of overlapping semantic concepts, the first N distinguishing high frequent features are displayed in addition to the common features. Thus related concepts like "computer hardware" and "computer software" are displayed as "computer, hardware" and "computer, software", if they happen to occur together in a cluster structure. This approach turned out to be a good approximation of the "concepts" enclosed within the documents of a cluster.

Additional advantages are accomplished by the aspect that said subset of said multitude of documents is determined by random selection.

Random selection is a very good approach for making sure that the subset, being the base for generated taxonomy, includes documents comprising the statistically most relevant features.

Additional advantages are accomplished by the aspect that the range of the document dates is divided in equally sized sub-ranges and said random selection is performed separately for documents with document dates from said sub-ranges.

Using the proposed approach guarantees that changes of the terms used within the documents ("evolution of terminology"), which occur over time, are fully reflected in the generated taxonomy and contribute to the establishment of concepts.

Additional advantages are accomplished by the aspect that said subset comprises up to 10% of said multitude of said documents.

According to the proposed methodology the taxonomy generated based upon said subset becomes stable, i.e. increasing the size of the subset will not change the generated taxonomy in an essential manner. The computing effort for taxonomy generation is thus reduced significantly. dr

BRIEF DESCRIPTION OF THE DRAWINGS

FIG. 3 shows an example of a node of the generated taxonomy for the current example taken from the lexical-affinity-based taxonomy.

FIG. 4 shows an example of a node of the generated taxonomy for the current example taken from the linguistic-feature-based taxonomy.

DESCRIPTION OF THE PREFERRED EMBODIMENT

Figure 1:
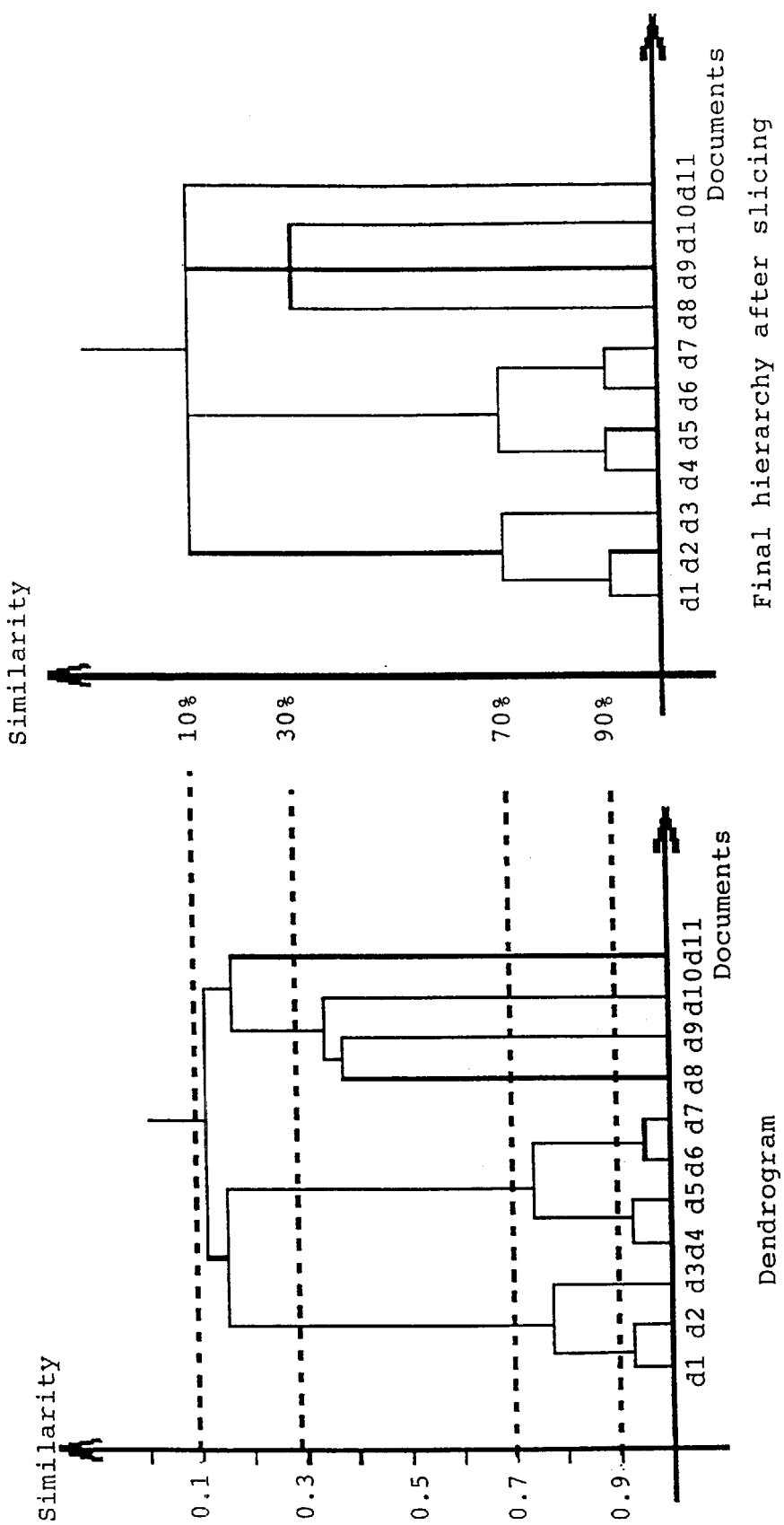
FIG. 1 shows a graphical representation of a dendrogram generated by the hierarchical clustering algorithm before and after applying the slicing technology.

Though current invention is illustrated on the basis of IBM's information mining products "IBM Intelligent Miner for Data" and "IBM Intelligent Miner for Text". But the proposed teaching may be exploited in any other context of information mining tools.

0.0 Introduction

Data mining takes advantage of the infrastructure of stored data, e.g., labels and relationships) to extract additional useful information. For example, by data mining a customer data base, one might discover everyone who buys product A also buys products B and C, but six month later. Further investigation would show if this is a necessary progression or a delay caused by inadequate information. In that case, marketing techniques can be applied to educate customers and shorten the sales cycle.

Text mining is the application of the idea of data mining to non-structured or less structured text files. Data mining permits the owner or user of the data to gain new insights and knowledge by finding patterns in the data which would not be recognizable using traditional data query and reporting techniques. These techniques permit comparisons to be made across data from many sources of differing types, extracting information that might not be obvious or even visible to the user, and organize documents and information by their subjects or themes. Text mining compared to data mining must operate in a less structured world. Documents rarely have strong internal infrastructure (and where they do, it is frequently focused on document format rather than document content). In text mining, meta data about documents is extracted from the document and stored in a data base where it may be "mined" using data base and data mining techniques. The meta data serves as a way to enrich the content of the document, not just on its own, but by the ways the mining software can then manipulate it. The text mining technique is a way to extend data mining methodologies to the immense and expanding volumes of stored text by an automated process that creates structured data describing documents.

Most organizations have large and increasing numbers of online documents which contain information of great potential value. Examples are:

Electronic mail from customers, containing feedback about products and services

Intranet documents such as memos and presentations which embody corporate expertise Technical reports which describe new technology News wires carrying information about the business environment and the activities of competitors.

The IBM Intelligent Miner for Text deals with these and many other kinds of text documents. It contains tools to Extract key information from text Organize documents by subject Find the predominant themes in a collection of documents Search for relevant documents using powerful and flexible queries The need for tools to deal with online documents is already large (one may think about the huge, growing and fast changing information on the internet) and is growing larger. Forrester Research has predicted that unstructured data (such as text) will become the predominant data type stored online. This implies a huge opportunity: to make more effective use of repositories of business communications, and other unstructured data, by using computer analysis. But the problem with text is that it is not designed to be used by computers. Unlike the tabular information typically stored in databases today, documents have only limited internal structure, if any. Furthermore, the important information they contain is not explicit but is implicit: buried in the text. Hence the "mining" metaphor—the computer rediscovers information that was encoded in the text by its author.

Many of the tools in Intelligent Miner for Text can be seen as information extractors which enrich documents with information about their contents. This information can be used as meta data about the documents. Meta data is structured data which can be stored in a database and could be used in turn for Data Mining. The tools in the Intelligent Miner for Text are designed to be used in building applications that deal with text. Often the first step is to extract key features from texts, to act as "handles" in further processing. Examples of features are the language of the text, or company names or dates mentioned. After feature extraction, the next step may be to assign the documents to subjects from a cataloging scheme, then to index them for ad-hoc searching. The tools in the Intelligent Miner for Text which support these and other functions will be described below.

0.0.1 Text Analysis Functions

Functions in this area analyze text to select features for further processing. They can be used by application builders.

1.0.1.1 Language Identification

The language identification tool can automatically discover the language(s) in which a document is written. It uses clues in the document's contents to identify the languages, and if the document is written in two languages it determines the approximate proportion of each one. The determination is based on a set of training documents in the languages. Its accuracy as shipped in the tool suite is usually close to 100% even for short text. The tool can be extended to cover additional languages or it can be trained for a completely new set of languages. Its accuracy in this case can be easily higher than 90%, even with limited training data. Applications of the language identification tool include: automating the process of organizing collections of indexable data by language; restricting search results by language; or routing documents to language translators.

0.0.1.2 Feature Extraction

The feature extraction component of the Intelligent Miner for Text recognizes significant vocabulary items in text. Examples of the vocabulary found by a feature extraction in a collection of financial news stories are:

credit line, European Investment Bank, credit facility, Eurodollar, convertible bond, equity warrant, Consul Restaurant, Enserch, Commodity Futures Trading Commission, end¡March, Commercial Union Assurance, dlrs of debt, commercial paper, Digital Equipment, commercial bank, Detroit Edison, CMOs, debtor country, Chronar, debt security, certificates of deposits, Dana, certificate of deposit, Credit Suisse First Boston, CCC, Credit Suisse, capital note, Credit Lyonnais The process is fully automatic—the vocabulary is not predefined. Nevertheless, as above example shows, the names and other multiword terms that are found are of high quality and in fact correspond closely to the characteristic vocabulary used in the domain of the documents being analyzed. In fact what is found is to a large degree the vocabulary in which concepts occurring in the collection are expressed. This makes Feature Extraction a powerful Text Mining technique. Among the features automatically recognized are Names, of people, organizations and places (name extraction)

Multiword terms (term extraction)

Abbreviations

Other vocabulary, such as dates and currency amounts

When analyzing single documents, the feature extractor can operate in two possible modes. In the first, it analyzes that document alone. In the preferred mode, it locates vocabulary in the document which occurs in a dictionary which it has previously built automatically from a collection of similar documents. When using a collection of documents, the feature extractor is able to aggregate the evidence from many documents to find the optimal vocabulary. For example, it can often detect the fact that several different items are really variants of the same feature, in which case it picks one as the canonical form. For words typically the lexical base form is used as canonical from; for example singular for nouns, infinitive for verbs. In case of names and terms the most uniquely describing from is used as canonical for; as a rule of the thumb this is usually (but not generally) the longest one.

In addition, it can then assign a statistical significance measure to each vocabulary item. The significance measure, called "Information Quotient" (IQ), is a number which is assigned to every vocabulary item/feature found in the collection; e.g. features that occur more frequently within a single document than within the whole document collection are rated high. The calculation of IQ uses a combination of statistical measures which together measure the significance of a word, phrase or name within the documents in the collection. The vocabulary items/features with the highest IQ are almost always names or multiword terms because they tend to convey a more focused meaning than do single words alone.

0.0.1.2.1 Name Extraction

Names are valuable clues to the subject of a text. Using fast and robust heuristics, the name extraction module locates occurrences of names in text and determines what type of entity the name refers to—person, place, organization, or "other", such as a publication, award, war, etc. The module processes either a single document or a collection of documents. For a single document, it provides the locations of all names that occur in the text. For a collection of documents, it produces a dictionary, or database, of names occurring in the collection.

Name extraction is based on the computation of Linguistic Features (LFs) in the text sources. LF extraction technology is able to identify and select names of people, organizations, locations, domain terms (multi-word terms), and other significant words and phrases from texts. The Feature Extraction tool performs a statistical analyses for the terms, e.g., calculates the frequency of LFs in documents and the whole collection. A main property of this tool is that it associates variants of the same underlying item with a single canonical form and then treats them as a single term during further processing.

All the names that refer to the same entity, for example "President Clinton", "Mr. Clinton" and "Bill Clinton", are recognized as referring to the same person. Each such group of variant names is assigned a "canonical name", (e.g., "Bill Clinton") to distinguish it from other groups referring to other entities ("Clinton, N.J."). The canonical name is the most explicit, least ambiguous name constructed from the different variants found in the document. Associating a particular occurrence of a variant with a canonical name reduces the ambiguity of variants. For example, in one document, "IRA" is associated with the Irish Republican Army, while in another it may be associated with an Individual Retirement Account.

The name extraction module does not require a preexisting database of names. Rather, it discovers names in the text, based on linguistically motivated heuristics that exploit typography and other regularities of language. It operates at high speed because it does not need to perform full syntactic parsing of the text. Discovering names in text is challenging because of the ambiguities inherent in natural language. For example, a conjunction like "and" may join two separate names (e.g., "Spain and France") or be itself embedded in a single name (e.g., "The Food and Drug Administration"). The heuristics employed by the name extraction module correctly handle structural ambiguity in the majority of the cases. In tests it has been found to correctly recognize 90–95% of the proper names present in edited text.

0.0.1.2.2 Term Extraction

The second major type of lexical clue to the subject of a document are the domain terms the document contains. The term extraction module uses a set of simple heuristics to identify multi-word technical terms in a document. Those heuristics, which are based on a dictionary containing part-of-speech information for English words, involve doing simple pattern matching in order to find expressions having the noun phrase structures characteristic of technical terms. This process is much faster than alternative approaches.

The term extraction module discovers terms automatically in text—it is not limited to finding terms in supplied in a separate. The term extractor ensures the quality of the set of terms it proposes by requiring that they be repeated within a document. Repetition in a single document is a signal that a term names a concept that the document is "about", thus helping to ensure that the expression is indeed a domain term. Furthermore, when Text Mining is analyzing a large collection of documents, the occurrence statistics for terms also helps to distinguish useful domain terms.

As for names, Text Mining's term extraction recognizes variant forms for the terms it identifies. For example, all of "alternate minimum tax", "alternative minimum tax", and "alternate minimum taxes" would be recognized as variants of the same canonical form.

0.0.1.2.3 Abbreviations

The formation of abbreviations and acronyms is a fruitful source of variants for names and terms in text. Text Mining's abbreviations recognizor identifies these short form variants and matches them with their full forms. When the full form (or something close to it) has also been recognized by name extraction or term extraction, then the short form is added to the set of already-identified variants for the existing canonical form. Otherwise, the full form becomes the canonical form of a new vocabulary item with the short form as its variant.

The recognizor is capable of handling a variety of common abbreviatory conventions. For example, both "EEPROM" and "electrically erasable PROM" are recognized as short forms for "electrically erasable programmable read-only memory". Text Mining also knows about conventions involving word-internal case ("MSDOS" matches "MicroSoft DOS") and prefixation ("MB" matches "megabyte").

0.0.1.2.4 Other Extractors

In order for the principal extractors to work effectively, Text Mining also includes other extractors which help analyze portions of the document text. Among these, the recognizors for numbers, dates, and currency amounts extract information which is potentially useful for certain applications.

The number recognizor identifies any of the following text expressions as a number expression and produces a canonical representation for it consisting of an appropriate integer or fixed-point value, as required: "one thousand three hundred and twenty-seven", "thirteen twenty-seven", "1327", "twenty-seven percent", "27%".

The date recognizor identifies expressions describing either absolute or relative dates and produces a canonical representation for them. The representation for relative dates (e.g., "next March 27th") assume that some external process provides a "reference date" with respect to which a date calculator can interpret the expression. Some example expressions, with their canonical representation, are:

| "March twenty-seventh, nineteen ninety-seven" | 1997/03/27 |
| "March 27, 1997" | 1997/03/27 |

-continued

| "next March 27th" | ref + 0000/03/27 |
| "tomorrow" | ref + 0000/00/01 |
| "a year ago" | ref − 0001/00/00 |

The money recognizor identifies expressions describing currency amounts and produces a canonical representation for them. Examples are:

| "twenty-seven dollars" | "27.000 dollars USA" |
| "DM 27" | "27.000 marks Germany" |

0.0.2 Clustering

Clustering is a fully automatic process which divides a collection of documents into groups. The documents in each group are similar to each other in some way. When the content of documents is used as the basis of the clustering (as in the IM for Text), the different groups correspond to different topics or themes that are discussed in the collection. Thus, clustering is a way to find out what the collection contains. To help to identify the topic of a group, the clustering tool identifies a list of terms or words or features in general, which are common in the documents in the group. Within a collection of objects a cluster could be defined as a group of objects whose members are more similar to each other than to the members of any other group. In text mining clustering is used to segment a document collection into subsets, the clusters, with the members of each cluster being similar with respect to certain interesting features. For clustering no predefined taxonomy or classification schemes are necessary.

An example of clustering in Text Mining would be to analyze e-mail from customers to find out if there are some common themes that have been overlooked. The effect of clustering is to segment a document collection into subsets (the clusters) within which the documents are similar in that they tend to have some common features. Clustering can be used to Provide an overview of the contents of a large document collection Identify hidden similarities Ease the process of browsing to find similar or related information.

Clustering can also be applied to a subset of documents. In particular, the TextMiner search engine can use clustering to reveal structure in the results list of a search, as described later.

Clusters are discovered in data by finding groups of objects which are more similar to each other than to the members of any other group. Therefore, the goal of cluster analysis is usually to determine a set of clusters such that inter-cluster similarity is minimized and intra-cluster similarity is maximized. Since in general there is no unique or best solution to this problem, the Intelligent Miner for Text provides a tool based on a robust algorithm which can be configured to match the intended application.

0.0.2.1 Hierarchical Clustering

Typically, the goal of cluster analysis is to determine a set of clusters, or a clustering, in which the inter-cluster similarity is minimized and intra-cluster similarity is maximized. In general, there is no unique or best solution to this problem. A number of different algorithms have been proposed that are more or less appropriate for different data collections and interests.

Hierarchical clustering algorithms work especially well for textual data. In contrast to flat clustering where the clusters have no genuine relationship, the clusters in a hierarchical approach are arranged in a clustering tree where related clusters occur in the same branch of the tree. The hierarchical clustering algorithm used by the clustering tool starts with a set of singleton clusters each containing a single document. These singleton clusters are the clusters at the bottom of the clustering tree, called leaves. It then identifies the two clusters in this set that are most similar and merges them together into a single cluster. This process is repeated until only a single cluster, the root, is left. When merging two clusters their intra-cluster similarity is calculated. The singleton clusters have an intra-cluster similarity of 100% since they contain only one document. The binary tree constructed during the clustering process contains the complete clustering information including all inter- and intra-cluster similarities. The inter-cluster similarity between two arbitrary clusters is the intra-cluster similarity of the first common cluster. The (binary) tree constructed during this process, called a dendrogram contains the complete clustering information including all inter- and intra-cluster similarities.

The binary tree might get very deep containing a lot of clusters with only a few documents. Because these binary trees are inconvenient to visualize a configurable slicing technique is applied in a further processing step. Clusters within the same branch that have a comparable intra-cluster similarity are merged into a single cluster. This reduces the depth of the tree and eases browsing or further processing. The left diagram in FIG. 1 shows a graphical representation of a dendrogram. The vertical axis measures the similarity. The horizontal lines in the tree are drawn at the similarity level that formed the corresponding cluster, i.e., the intra-cluster similarity for this cluster. The inter-cluster similarity between two arbitrary clusters is the similarity level of the first common cluster. Pure dendrograms are often inconvenient to visualize and interpret as they are binary. Therefore the configurable slicing technique has been applied that identifies the clusters within the tree which have a comparable degree of intra-cluster similarity. With this information new clusters are formed by merging previous clusters. Slicing can be adjusted to individual needs. The clustering tool allows the user to set the upper and lower thresholds of intra-cluster similarity, and to define the number of slicing-steps at which slicing is performed. For example, specifying an upper threshold of 90%, a lower threshold of 10%, and the number of slice steps as 8, the clustering tool will check for potential clusters at similarity levels of 90%, 80%, 70%, 60%, 40%, 30%, 20%, and finally 10%. The right diagram in FIG. 1 shows the result of slicing for the dendrogram on the left with the above parameter setting. In this case the two clusters {d8,d9} and {d10} have been merged to a new cluster {d8,d9,d10}.

A convenient way to combine a coarse overview and detailed information of the clustering structure is to repeat the slicing at different levels of intra-cluster similarity thresholds. The combined output reflects the most important decisions of the hierarchical clustering algorithm at some snapshots, taken at different levels.

0.0.2.2 Computation of Document Similarity Using Lexical Affinities

It is clear that the notion of similarity between documents and clusters is crucial. A very simple similarity measure would be the degree of overlap for single words in the documents. However, due to the ambiguity of single words, this measure of similarity is rather imprecise, and the resulting clustering would not be very useful in general. One alternative to using single words would be to perform a semantic analysis of the documents, in order to find the concepts mentioned in the text and use them for clustering. This kind of analysis is very expensive and furthermore depends on a lot of domain-dependent knowledge that has to be constructed manually or obtained from other sources. Instead of taking this approach, the clustering tool uses lexical affinities instead of single words. A lexical affinity is a correlated group of words which appear frequently within a short distance of one another. Lexical affinities include phrases like "online library" or "computer hardware" as well as other less readable word groupings. They are generated dynamically, thus they are specific for each collection. A set of semantically rich terms can be obtained without a need to hand-code a specialized lexicon or a thesaurus. The clustering tool uses a list of the lexical affinities in each document as the basis for its similarity calculation. A cluster can be labeled with the lexical affinities it contains, which allows a user to quickly assess the characteristics of the cluster.

Of course instead of a lexical affinity based feature extraction methodology for similarity calculation any other feature extraction methodology (for instance linguistic feature extraction) may be used.

0.0.3 Categorization

In general, to categorize objects means to assign them to predefined categories or classes from a taxonomy. The categories may be overlapping or subsuming. For text mining, categorization means to assign categories to documents or to organize documents with respect to a predefined organization. These could for example be the folders on a desktop, which are usually organized by topics or themes. Categorization in the context of text mining means to assign documents to preexisting categories, sometimes called topics or themes. The categories are chosen to match the intended use of the collection and have to be trained beforehand. By assigning documents to categories, text mining can help to organize them. While categorization cannot replace the kind of cataloging a librarian does, it provides a much less expensive alternative. In addition it can be very useful in many other applications:

- to organize intranet documents. For example, documents on an intranet might be divided into categories like Personal policy, Lotus Notes information, or Computer information. It has been estimated that it costs at least $25 to have a librarian catalogue an item. It is clearly impractical to catalogue the millions of documents on an intranet in this way. By using automatic categorization, any document could be assigned to an organization scheme and a link to the respective category could be generated automatically.
- to assign documents to folders. Categorization can help to file documents in a smarter way. For example, it could help a person who has to assign e-mail to a set of folders by suggesting which folders should be considered.

The categorization tool assigns documents to predefined categories. For this purpose the categorization tool first has to be trained with a training set consisting of a collection of sample documents for each category. These collections are used to create a category scheme. The training uses the feature extraction tool in order to store only relevant information in the dictionary. The category scheme is a dictionary which encodes in a condensed form significant vocabulary statistics for each category. These statistics are used by categorization tool to determine the category or categories whose sample documents are closest to the documents at hand. The purpose of the categorization algorithm is to return a ranked list of categories for a given piece of text, called query document. The rank value is a sum over the number of occurrences of all the different vocabulary items (i.e. canonical forms or their variants) in the query document. Each number of occurrences is weighted by a term that takes into account the relative frequency of the vocabulary item in the category itself in proportion to its relative frequency in the whole training set. Thus a word with a high frequency in a single category and a comparatively low frequency in the whole training set will have a higher weight than a word that occurs very frequently in the training set or a word that occurs less frequently in the category. Thus for each category a rank value will be calculated with respect to the vocabulary of the query document. The output of the categorization tool is a text document that lists each input document together with its highest ranked categories. The number of the returned categories can be specified by the user. The rank value is returned as well and can be used for further processing.

The categorization approach may be based on any feature extraction algorithm.

0.1 General Requirements and Structure of the Taxonomy Generator

The discipline of text mining merges methods of information retrieval, computational linguistics and data mining to achieve means for an automatic analysis of large and unstructured corpora of digital documents. Although this seems to be pretty close to data mining-like engineering for large sets of raw transactional records, there are a few but important differences.

First, the question of similarity of two different texts can not be answered independent from the intended solution. A plain word-by-word comparison, statistical phrase detection or sophisticated names extraction methods may judge the same two documents to be similar or not—the acceptability of this decision depends whether one must provide for instance a coarse overview of a company's patent text collection, as opposed for instance to the task of detecting threads of important persons in a news wire text stream. In the first case, the semantic notion of similarity could be reduced to standard text processing techniques (stemming, dictionary building and lookup), whereas the second case could require heuristics and parsing techniques as they are developed in the area of Natural Language Processing. Fact extraction from texts, and the harvesting of crisp and vague information, as it is done in information discovering projects, however, require sophisticated knowledge models, which tend to become domain specific.

As for the second difference, text mining must deal with a much higher dimensionality of features per entity. For a real-world text database the number of potential features range up to tens or hundred of thousands. This has a major impact, not only on the design of the mining algorithms used, but also puts a heavy burden on the subsequent visualization modules.

The current invention especially solves the problem to generate a taxonomy for an independently gained collection of digital documents whereby the number of documents is extremely large. Moreover the suggest method has been adapted to scale very well and to be able to even treat a number of documents, which is significantly larger. In case of the example to be used to demonstrate the current invention, it consists of more than 70.000 documents covering one year of a news wire stream with medium sized documents (between hundreds and a thousand lines of text). The goal of the current invention was to provide a design to automatically generate a taxonomy, which must fulfill the same purpose as the keywords and which can be used to detect new and unforeseen intra-document relationships. Further focus has been given to two major problems of text mining in a real-world environment: what are sufficient criteria to consider two documents similar and how to reduce the dimensionality of a full-text based domain.

By analyzing and judging the taxonomies generated by the suggested method of taxonomy generation it may be shown that the current invention solves the following problems of the state of the art:

Navigational Balance

The taxonomy must be well-balanced for navigation by an end-user. In particular, the fan-out at each level of the hierarchy must be limited (goal: less than 20), the depth must be limited (maximum 6 levels), and there must not be empty nodes. Given this specifications, a standard tree browser can be used to browse the taxonomy, since it will fit on a typical screen.

Orientation

Nodes in the taxonomy should reflect "concepts" and be adequately labeled so that the labels of the nodes give sufficient orientation for a user traversing the taxonomy.

Coherence and Selectivity

The leaf nodes in the taxonomy should be maximally coherent with all assigned documents having the same thematic content. Related documents from different nodes should appear within short distance in the taxonomy structure. For each non-leaf node, the selectivity of the computed taxonomy should be reasonable high, i.e., one must be able to anticipate what will be the difference(s) between branches originating at this node.

Domain-independence of All Applied Technologies

The proposed method may not use any hand-coded knowledge derived from an analysis of the given document collection to steer the taxonomy generation process.

Linguistic Methods to Be Integrated to Increase the Conceptual Quality of the Taxonomy Conceptual quality is being defined as:

coherence and selectivity of document clusters and significance of extracted terms and phrases The proposed method has to cope with the ambiguity problem of natural language. Two feature extracting technologies can be exploited by the current teaching: namely the Lexical Affinities (LA) and the Feature Extraction technology. Both techniques are compared against manually edited texts, i.e., the keywords assigned to the document collection by the editors to judge their appropriateness.

Scalability

Any document of the collection must be assigned to some leaf node in the taxonomy and the whole process must be applicable to significantly larger databases than the sample provided. Therefore a separate routing task has been introduced to the proposed technique to guarantee scalability for arbitrary collection sizes and processing of forthcoming documents. The routing task is to train a given taxonomy and sort all documents into appropriate clusters—both, during the build phase and for later use (adding new documents to the database).

Extensibility

The automatically generated taxonomies might not match 'common sense' expectations, of what is a familiar, well-known index for a large corpus with a high diversity of topics. Hence, the current invention shows well-defined interfaces to add domain-oriented extra knowledge (like a thesaurus) to improve the navigational ease of use of the taxonomy tree.

Provide a User Interface to Ease Exploration and Evaluation

Once a taxonomy is generated, the user of the system must be able to navigate using contextual browsing information; for instance a user could zoom-in, which is top-down browsing from high-level concepts to individual documents (news article).

Figure 2:
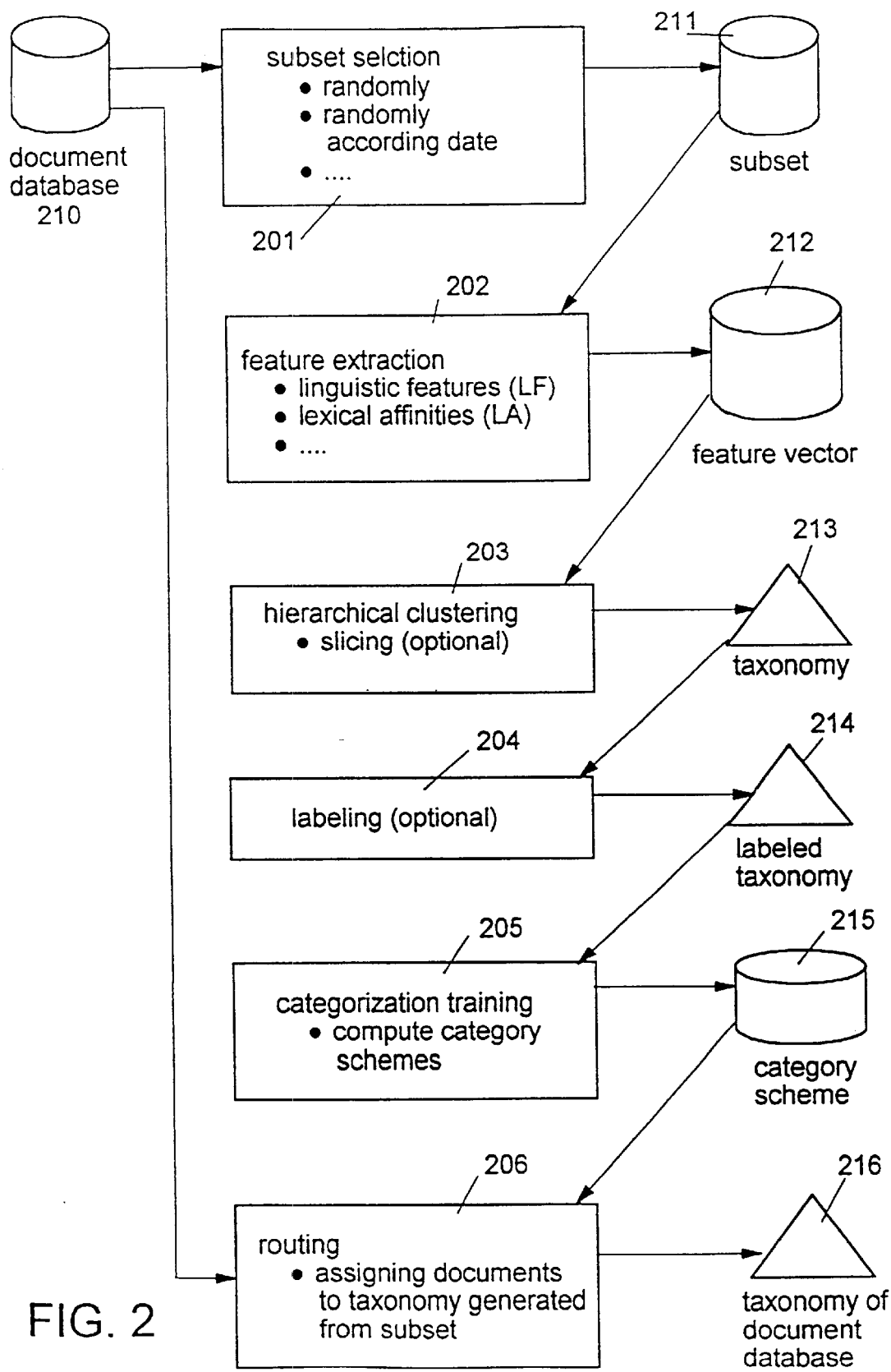
FIG. 2 gives an overview of the process architecture of the proposed method of generating a content taxonomy.

FIG. 2 gives an overview of the process architecture of the proposed method of generating a content taxonomy.

1. The method of generating a content taxonomy according the current invention starts by selecting (201) a subset (211) of the multitude of electronic documents (210). For the example of the current invention the generation is based on a subset of 10% of the samples taken from the large document database (73.000 documents). A taxonomy of a large number of documents generated according the suggested method is stable already using a sample of up to 10% of the documents. The subset has been determined by random selection. The subset selection process can be improved if the random selection process is being performed based on documents with similar size or similar date. Members of the sample then were selected based on a constant interval over the complete period of time which was spanned by the news collection.
2. The sample (211) is then piped into the corresponding feature extraction (202) tool, which produces a concise representation of each document of said subset, in form of the feature vectors of the subset documents (212).
3. The calculated feature vectors (212) are used to determine a taxonomy (213) for the selected subset by the hierarchical clustering module (203).
4. The label generation (204) as the next step works on the same subset of the document database to force consistency between the taxonomy structure and the assigned labels generating a labeled taxonomy (214).
5. When clustering and labeling is finished, the data and the processing forks into the categorization training (205). The training of the categorizer is performed on the same subset due to force consistency between the taxonomy structure and the assigned labels. The categorization step generates category schemes (215) for the document clusters assigned to the leaf nodes of the taxonomy, said category schemes being the feature vectors of the said clusters.
6. Afterwards, a final routing process (206) takes each unprocessed document of the document database (210) and assigns it to its most appropriate cluster. The clusters are presented to the user together with the precomputed labels representing the taxonomy of the whole document database (216).

0.2 Pre-Processing Digital Documents: Feature Extraction

Two preprocessing functions are suggested to perform a mapping from raw text into countable and comparable, discrete variable values: feature extraction by lexical affinity (LA) technology and by linguistic feature (LF) technology. Actually both technology approaches are providing feature extraction capability based on certain "linguistic" properties of the documents. Nevertheless the terminology of "lexical affinity (LA)" and "linguistic feature (LF)" as used in the current description have to understood in the more narrow sense as defined below.

Lexical affinities (LAs) denote the common occurrences of phrases like "service provider" or "computer software", which have shown to a have a much higher semantic meaning compared to the single terms "service", "computer", or "solutions". In the current implementation a five word window to identify co-occurring words was of specific advantage. This fast and powerful method has been combined with word stemming to increase the recall of identified topics. Although one loses discriminative power in certain circumstances, stemmed lexical affinities have shown to produce much more dense relationship webs.

LAs are completely domain-independent. The only adaptation to a corpus required is to modify the stop word list used by the LA extractor. Meaningless and high frequent terms like "http", "updated-by", etc., can be identified and then excluded from the process by putting them on the stop word list. This little adaptation step is recommended for any usage of LAs and clustering. Another advantage of LAs is that this technology can be ported easily to other languages.

The second technique applied was the computation of Linguistic Features (LFs) in the text sources. LF extraction is able to identify and select names of people, organizations, locations, domain terms (multi-word terms), and other significant words and phrases from texts. The Feature Extraction tool performs a statistical analyses for the terms, e.g., calculates the frequency of LFs in documents and the whole collection. A main property of this tool is that it associates variants of the same underlying item with a single canonical form and then treats them as a single term during further processing, like in "President Clinton", vs. "Bill Clinton" and "The President of the United States".

However, LF extraction tends to be too productive for clustering. The number of singleton values computed causes a problem for the computation of the term-vector representation of documents and clusters. To overcome this, the selection of terms for the clustering step can be based on statistically or content-oriented filtering of term output. This gives the LF-based approach the advantage that more parameters can be changed in the process to tune the taxonomy towards a well balanced view of the data without losing overall quality. For example, selecting only names and multi-word terms as input features for clustering in a business database tends to build the taxonomy around companies and their products. Using a very sharp measure (e.g. "just all the names of persons, companies etc.") leads to very coherent clusters, but decreases the navigational balance of the complete taxonomy. Using a loose measure (i.e.. all (single) words that are not part of the stop word list) increases the cluster coherence at the expense of meaningful cluster descriptors (e.g.. one ended up with terms like "work", "system", "information", . . . ).

As a solution to this problem the invention suggests to use names, terms and general words, but to apply filtering to remove high-frequency terms and very low-frequency terms. Ignoring high-frequency terms basically is close to automatically extending a stop word list. Filtering low-frequency terms avoids over fitting at the lower end of the taxonomy.

0.3 Hierarchical Clustering

The hierarchical clustering algorithm (HCA) exploited by the current invention is a bottom-up algorithm. It starts with the individual documents and builds the bottom clusters first. It then works its way upward in the hierarchy forming higher-level clusters by grouping together related clusters. The advantage of the HCA approach is that it achieves a very good coherence at the lower levels of the resulting taxonomy. Usually, the first level of the generated hierarchy is too detailed (with the exception of using the supplied keywords as input) so this remains an issue for application programming when building a real solution based on this technology. Scalability is achieved in this approach by building the taxonomy only on a subset of the documents and then routing the remaining documents into their respective categories.

Like most agglomerative cluster algorithms, the HCA internally builds up a complete cluster hierarchy (a dendrogram). This hierarchy relates each pair of documents and annotates this relationship with the corresponding degree of similarity. Slicing a dendrogram into layers with certain ranges of similarity allows to speak of high-level concepts (with a lower intra-cluster similarity) and more concrete topics (closer to the leafs of the dendrogram, with high similarities). Since the routing task has been assigned to a subsequent processing step, it was possible to identify the optimal range specification to ease the process of browsing the final taxonomy, which essentially is a dendrogram sliced into (a maximum of) six levels. Of course the proposed approach allows to adjust the generated hierarchy to an desired (predefined) number of levels.

A fundamental advantage of the current invention is: working on a subset does not impact quality of the generated taxonomy hierarchy. Cluster runs with different subset sizes and otherwise unchanged parameters showed that the taxonomy becomes 'stable' at about 10% of the documents (for the current example), i.e. the resulting structure did not change significantly when increasing the sample size. Thus to achieve a sufficient sampling of a heterogeneous text collection, one must create a taxonomy based upon up to 10% of the topics in the collection or work with at least 5000 documents to operate the HCA algorithm within a statistical reasonable base of documents. The point of saturation changes slightly depending on the input preprocessing technique, which has been applied. For input data having a lower dimensionality of features (supplied keywords, LA-based preprocessing), it turns out that no more significant changes above ~4000 documents (if sampled properly) is achieved. For higher dimensional input the size of the sample has to be increased by some extra data (i.e. documents).

The quality achievable for the routing task with this size of training data is very high (see the next section on the accuracy of the router). Clustering of a 5000 document sample takes about 1.5 hours on a RS/6000 43P. This relatively short elapsed time for taxonomy generation is of great advantage because it allows for short turnaround cycles while experimenting with various process setups.

0.4 Routing New Documents

According to the general structure of the taxonomy generation algorithm of the current invention its purpose is not only to organize the given document collection (the subset), but also to be able to classify new incoming documents.

The topic categorization step assigns documents to predefined categories, which in the current case are the leaf nodes of the taxonomy derived by the hierarchical clustering. In a training phase the tool extracts relevant vocabulary statistics from sample documents for each category and stores these in a dictionary, called a category scheme. This training uses the same feature extraction technology and tools as mentioned above, and the vocabulary items actually are the extracted features. The trained scheme can be thought of as a set of feature vectors, one per category, in the multidimensional vector space where each feature corresponds to a dimension. Each vector encodes frequency information for each feature.

For the actual categorization of an incoming document, called query document, the processing step computes its feature vector using the feature extraction tool in the most efficient mode. It then returns a ranked list of categories, sorted according to the angle between the query document vector and the respective category vector.

For both versions of the taxonomy, based upon full linguistic preprocessing and upon lexical affinities, a category scheme can be trained as follows. The categories were taken to be the leaves of the taxonomy with the documents assigned to them as training material. The table gives details about resource requirements and performance of the two category schemes:

| Taxonomy | Full linguistic preprocessing | statistical phrase-analysis |
|---|---|---|
| # Categories | 686 | 686 |
| # Training documents | 3.729 | 6.534 |
| Training set size | 18.8 MB | 31.1 MB |
| Scheme file size | 35 MB | 41 MB |
| Training time | 20 min | 40 min |

With both the category schemes the routing task was performed on all of the 73031 documents. The complete routing into one taxonomy took around 100 minutes, i.e., the routing speed is above 200MB/h. Each document was assigned to the taxonomy category that received the highest rank value from the topic categorizer. Of those documents that constituted the training set the correct classification could be verified in 99.95% (LF), and 99.6% (LA). Clearly, this nearly perfect reclassification for the LF taxonomy is to be expected on the grounds that the clusters created by the clustering engine define themselves through a similarity measure akin to the one used in the classification step. But also the low reclassification error for LA shows that the LA-based category scheme can be trained very well by the categorizer.

0.5 Results

By applying lexical-affinity extraction as feature extraction technology, a taxonomy has been achieved for an example of more than 70,000 news documents which was suited for navigation, using up to 6 levels if required to visualize different aspects of concepts contained in the clusters. It shows an average branching factor of 3 with no more than 12 branches in the inner parts, a reasonably sized second-level structure (252 nodes), and a size of the leaf nodes that is well-balanced. The root of the taxonomy reflects the different topics as they can be found in such a large collection.

FIG. 3 shows an example of a node of the generated taxonomy for the current example taken from the LA-based taxonomy. A node represents a cluster, printed on the left hand side, and the outgoing links, printed on the right hand side. It either links from level x down to level x+1 or (in case it is a leaf node) it shows a terminal cluster which lists the titles of all documents belonging to this cluster. The example node is taken from the second layer of the hierarchy, i.e., it links from level 2 to level 3 (where level 1 is the root of the tree). In cases like the one shown here, where the subclusters have similar top-frequent terms (NT, window), the output is augmented by disambiguating terms, taken from the cluster representation. Thus, user will always navigate within a semantic context, showing the alternatives for the actual browsing decision.

The taxonomy shows very good coherence, i.e., related documents are grouped closely together. According to the preferred embodiment of the current invention the 5 most frequent distinguishing LAs within each cluster have been selected as the cluster label. Thus similar concepts like "computer hardware" and "computer software" are displayed as "computer, hardware" and "computer, software", if they happen to occur together in a cluster structure. Overall, the labels represent the cluster content well and allow for easy orientation towards interesting sub clusters.

The snapshot of FIG. 4 is an example taken from the generated taxonomy which was generated based upon the linguistic-feature-based technology extracting names, terms and general words. Overall, the taxonomy is broader than the LA-based taxonomy at the first and second level (73 and 283 nodes, respectively). Average branching factor is 3 with a maximum of 7 in the inner parts. Coherence is very good throughout the taxonomy. The 5 most frequent LFs within each cluster have been selected as the cluster label. Since the LFs are a mixture of names, phrases, and single words, orientation is slightly worse than for LAs in some cases. Readability, though, is pretty good.

In general the generated taxonomies are well-balanced and coherent down from level 2 of the hierarchy. The leaf nodes of the taxonomies are very coherent and related documents are within short distance in the taxonomy. Selecting the n most frequent terms in a cluster for labeling gives good overall orientation in the structure.

We claim:

1. A computer-executable method of generating a content taxonomy of a multitude of documents (210) stored on a computer system, said method comprising:
   a subset-selection-step (201), for selecting a subset of said multitude of documents;
   a taxonomy-generation-step (202 to 205), for generating a taxonomy for said subset,
   wherein said taxonomy is a tree-structured taxonomy-hierarchy, and
   wherein said subset is divided into a set of clusters with largest intra-similarity, and
   wherein each of said clusters of largest intra-similarity is assigned to a leaf-node of said taxonomy-hierarchy as outer-clusters, and
   wherein inner-nodes of said taxonomy-hierarchy order said subset, starting with said outer-clusters, into inner-clusters with increasing cluster size and decreasing similarity, and
   wherein said taxonomy-generation-step further comprises a first-feature-extraction-step (202) for extracting for each document of said subset its features, and for computing its feature statistics in a feature-vector (212) as a representation of said document; and
   a routing-selection-step (206), for computing, for each unprocessed document of said multitude of documents not belonging to said subset, similarities with said outer-clusters, and for assigning said document to the leaf-node of said taxonomy-hierarchy being the outer-cluster with largest similarty.

2. The method of claim 1, wherein said taxonomy-generation-step further comprises a clustering-step (203) using a hierarchical clustering algorithm for generating said taxonomy-hierarchy, and using said feature-vectors for determining similarity.

3. The method of claim 1, wherein said features are extracted based on lexical affinities within said documents.

4. The method of claim 3, wherein said lexical affinities are extracted with a window of M words to identify co-occurring words.

5. The method of claim 4, wherein M is a natural number with 1<M≦5.

6. The method of claim 1, wherein said features are extracted based on linguistic features within said documents.

7. The method of claim 1, wherein extracted features are selectively ignored based on statistical frequency extremes.

8. The method of claim 1, wherein the depth of the taxonomy-hierarchy is limited to L levels by using a slicing technique to merge most similar clusters into one cluster until said taxonomy-hierarchy includes L levels.

9. The method of claim 8, wherein L is a natural number from the range 1≦L≦12.

10. The method of claim 1, wherein said taxonomy-generation-step further comprises a labeling-step (204) labeling each node in the taxonomy-hierarchy.

11. The method of claim 10, wherein the N most frequent distinguishing features of a cluster of a node in the taxonomy-hierarchy are used as labels.

12. The method of claim 11, wherein N is a natural number with 1≦N≦10.

13. The method of claim 1, wherein said subset of said multitude of documents is determined by random selection.

14. The method of claim 13, wherein the range of the document dates is divided into equally sized sub-ranges and said random selection is performed separately for documents with document dates from said sub-ranges.

15. The method of claim 1, wherein said subset comprises up to 10% of said multitude of said documents.

16. A computer program product comprising a computer usable medium having computer readable program code means embodied in said medium for generating a content taxonomy of a multitude of documents stored on a computer system, said computer readable program code means comprising:
   a subset selector for selecting a subset of said multitude of documents;
   a taxonomy generator for generating a taxonomy for said subset, wherein said taxonomy generator further comprises a first-feature-extractor for extracting for each document of said subset its features, and for computing its feature statistics in a feature-vector as a representation of said document; and
   a routing selector for computing, for each unprocessed document of said multitude of documents not belonging to said subset, similarities with said outer-clusters and for assigning said document to the leaf-node of said taxonomy-hierarchy being the outer-cluster with largest similarity,
      wherein said taxonomy is a tree-structured taxonomy-hierarchy, and
      wherein said subset is divided into a set of clusters with largest intra-similarity, and
      wherein each of said clusters of largest intra-similarity is assigned to a leaf-node of said taxonomy-hierarchy as outer-clusters, and
      wherein inner-nodes of said taxonomy-hierarchy order said subset, starting with said outer-clusters, into inner-clusters with increasing cluster size and decreasing similarity.

17. A system for generating a content taxonomy of a multitude of documents stored on a computer system, said system comprising:
   means for selecting a subset of said multitude of documents;
   means for generating a taxonomy for said subset,
      wherein said taxonomy is a tree-structured taxonomy-hierarchy, and
      wherein said subset is divided into a set of clusters with largest intra-similarity, and
      wherein each of said clusters of largest intra-similarity is assigned to a leaf-node of said taxonomy-hierarchy as outer-clusters, and
      wherein inner-nodes of said taxonomy-hierarchy order said subset, starting with said outer-clusters, into inner-clusters with increasing cluster size and decreasing similarity, and wherein said means for generating further comprises a first-feature-extractor means for extracting for each document of said subset its features, and for computing its feature statistics in a feature-vector as a representation of said document; and means for computing, for each unprocessed document of said multitude of documents not belonging to said subset, similarities with said outer-clusters, and for assigning said document to the leaf-node of said taxonomy-hierarchy being the outer-cluster with largest similarity.

18. The system of claim 17, wherein said means for generating further comprises a clustering-tool using a hierarchical clustering algorithm for generating said taxonomy-hierarchy, and using said feature-vectors for determining similarity.

19. The system of claim 17, wherein said features are extracted based on lexical affinities within said documents.

20. The system of claim 19, wherein said lexical affinities are extracted with a window of M words to identify co-occuring words.

21. The system of claim 20, wherein M is a natural number with $1<M\leq5$.

22. The system of claim 17, wherein said features are extracted based on linguistic features within said documents.

23. The system of claim 17, wherein extracted features are selectively ignored based on statistical frequency extremes.

24. The system of claim 17, wherein the depth of the taxonomy-hierarchy is limited to L levels by using a slicing technique to merge most similar clusters into one cluster until said taxonomy-hierarchy includes L levels.

25. The system of claim 24, wherein L is a natural number from the range $1<L\leq12$.

26. The system of claim 17, wherein said taxonomy-generation-tool further comprises a labeling-tool labeling each node in the taxonomy-hierarchy.

27. The system of claim 26, wherein the N most frequent distinguishing features of a cluster of a node in the taxonomy-hierarchy are used as labels.

28. The system of claim 27, wherein N is a natural number with $1\leq N\leq10$.

29. The system of claim 17, wherein said subset of said multitude of documents is determined by random selection.

30. The system of claim 29, wherein the range of the document dates is divided into equally sized sub-ranges and said random selection is performed separately for documents with document dates from said sub-ranges.

31. The system of claim 17, wherein said subset comprises up to 10% of said multitude of said documents.

* * * * *